UNITED STATES PATENT OFFICE.

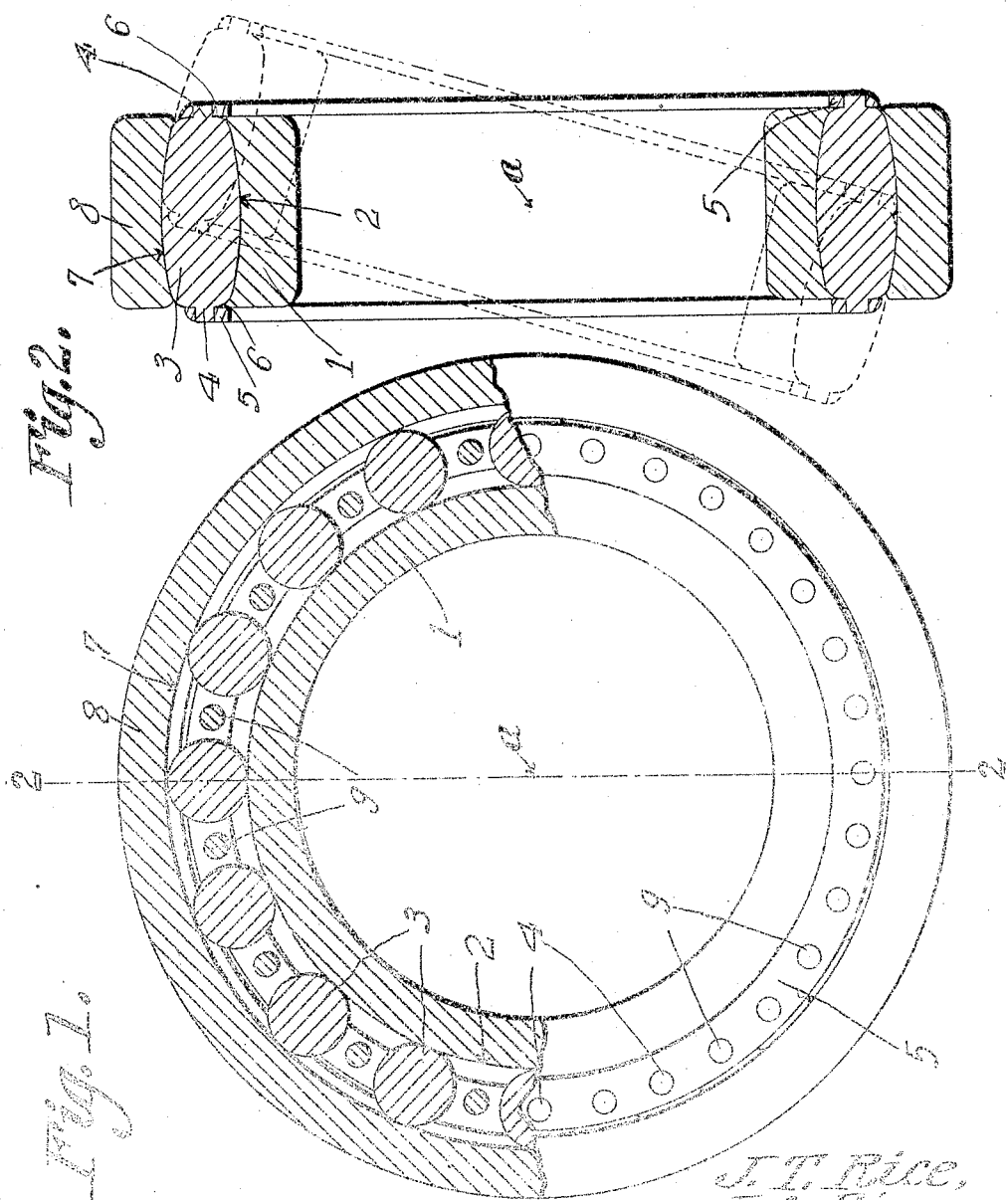
J. T., J. A. AND R. A. RICE.
ANTIFRICTION BEARING.
APPLICATION FILED AUG. 7, 1916.
1,338,868.
Patented May 4, 1920.

JOEL TROUT RICE, JOEL A. RICE, AND ROYAL A. RICE, OF NEW YORK, N. Y.

ANTIFRICTION-BEARING.

1,338,868.   Specification of Letters Patent.   Patented May 4, 1920.

Application filed August 7, 1916. Serial No. 113,568.

*To all whom it may concern:*

Be it known that we, JOEL T. RICE, JOEL A. RICE, and ROYAL A. RICE, citizens of the United States, residing at New York, in the county of Bronx, State of New York, have invented a new and useful Antifriction-Bearing, of which the following is a specification.

This invention relates to anti-friction bearings, one of its objects being to provide a self alining bearing utilizing inner and outer rings held against detachment from each other by an annular series of rollers constituting the anti-friction elements of the bearing.

A further object is to provide simple and efficient means whereby the anti-friction rollers are prevented from wedging between the rings of the bearing should said rings shift relative to each other.

A still further object is to provide a bearing in which either of the rings is capable of swinging about any diametrical axis extending therethrough without interfering with the rotation of one ring relative to the other and without allowing the rings to completely separate.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a view partly in side elevation and partly in section of a bearing embodying the present improvements.

Fig. 2 is a section on line 2—2 Fig. 1, an extreme position being indicated by dotted lines.

Referring to the figures by characters of reference 1 designates the inner ring of the bearing the same being formed in a single piece and provided, in its outer periphery, with a race 2 in which are seated regularly spaced anti-friction rollers 3. These rollers have terminal bearing studs 4 mounted for rotation in the side rings 5 of the bearing cage. The faces of the rollers are curved from end to end so that the outermost portion of the surface of each roll will be extended along an arc concentric with the center $a$ of the inner ring, as shown particularly in Fig. 2. To prevent lateral displacement of the cage and the rollers relative to the ring 1, tapered flanges 6 are formed along the sides of the periphery of ring 1 so as to lap portions of the ends of the rollers, said ends being rounded as shown. These flanges 6 are extended continuously around the ring 1.

Rollers 3 project into a race 7 formed in the inner periphery of an outer ring 8, this race being curved transversely along lines concentric with the center $a$. Pins $g$ connect the side rings 5 and hold them in place.

By arranging the parts in the manner described and shaping them in the manner set forth it will be apparent that should the ring 8 be swung about any diameter thereof the race 7 would slide along all of the rollers 3 except those adjacent the ends of the axis of movement, which rollers would constitute bearings or pivots on which the ring would turn. Thus, obviously, either ring 1 or 8 can adjust itself angularly relative to the other ring, but certain of the rollers will at all times prevent the two rings 1 and 8 from being separated. In other words, the rollers 3 constitute both anti-friction elements and keys for holding the rings 1 and 8 together. The flanges 6 at the sides of the inner ring 1, by lapping the ends of the rollers 3, prevent said rollers from shifting transversely of the ring 1 and becoming wedged between the two races 2 and 7 during relative angular movement of the rings about diametrical axes.

It will be noted that all of the rings employed in the construction of the bearing are endless unbroken rings. However, these rings can all be easily assembled by holding ring 1 within but at right angles to the ring 8 and by successively positioning the rollers 3 in the cage and gradually turning said cage until all of the rollers have been assembled. After all of the parts have thus become assembled it becomes impossible to separate them unless certain of the rollers are removed from the cage.

What is claimed is:—

An anti-friction bearing including an outer ring having a curved surface, an inner ring having a curved outer surface terminating in flanges, spaced parallel rings, anti-friction rollers supported by the rings, the flanges of the outer curved surface of the inner ring extending upwardly and lying between the parallel rings and the ends of the rollers, thereby forming a housing for the lower portions of the rollers, and means for connecting the concentric rings.

In testimony that we claim the foregoing as our own, we have hereto affixed our signatures.

JOEL TROUT RICE.
JOEL A. RICE.
ROYAL A. RICE.